3,398,175
SILPHENYLENE-CONTAINING
BUILDING BLOCKS
Robert H. Leitheiser, Minneapolis, Minn., assignor to Dow
Corning Corporation, Midland, Mich., a corporation of
Michigan
No Drawing. Filed Feb. 8, 1965, Ser. No. 431,160
22 Claims. (Cl. 260—448.2)

ABSTRACT OF THE DISCLOSURE

Silphenylene compounds are disclosed which have the formulae

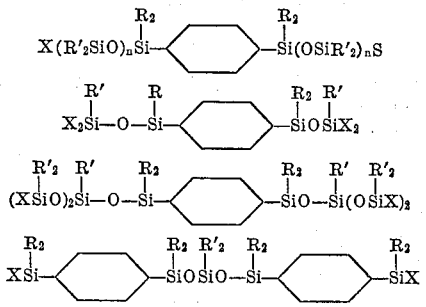

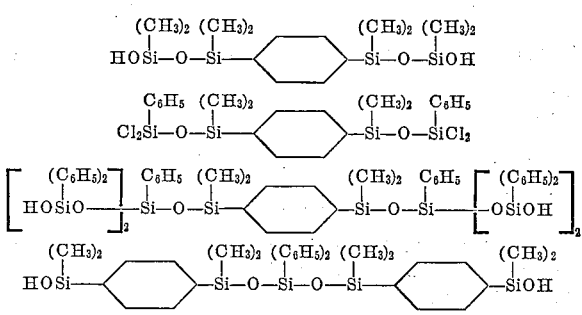

where each R and R' is methyl or phenyl, X is halogen, hydrogen, hydroxyl or alkoxy and $n$ is 1 to 3. Examples of these silphenylene compounds are Serial Number: 431,-160

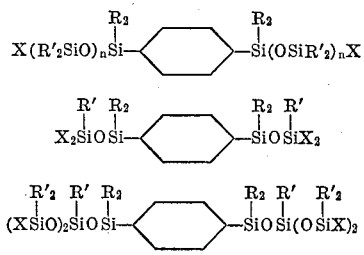

These silphenylene compounds are useful building blocks for thermally stable resins and elastomers.

SPECIFICATION

This invention relates to silphenylene-containing siloxanes which contain at least one tetraorganodisilphenylene unit and organosiloxy units.

An object of this invention is to provide new silphenylene-containing siloxanes which are building blocks for thermally stable resins and elastomers. Another object is to provide silphenylene-containing siloxanes which are building blocks for polymers having structures of regular order. These and other objects and advantages will be apparent from the following description of the present invention.

The present invention relates to a composition of matter of a formula selected from the group consisting of

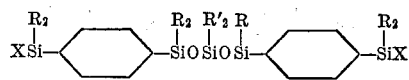

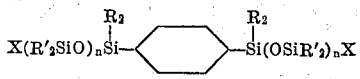

and

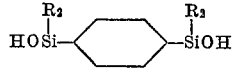

where each R and R' is a monovalent hydrocarbon radical selected from the group consisting of methyl radicals and phenyl radicals, X is a monovalent radical selected from the group consisting of halogen atoms, hydrogen atoms, hydroxyl radicals and alkoxy radicals having from 1 to 4 inclusive carbon atoms, and $n$ is an integer from 1 to 3 inclusive.

The compounds of the formula

where R, R', X, and $n$ are defined above are best prepared when $n=1$ by reacting, chlorosilanes of the formula

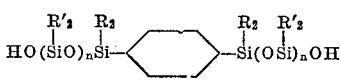

where X is a hydrogen atom, a halogen atom or an alkoxy radical with diols of the formula $$HO\underset{R_2}{\overset{R_2}{Si}}-\bigcirc-\underset{}{Si}OH$$

in the presence of a hydrogen halide acceptor such as pyridine, alpha-picoline, aniline or tertiary amines such as triethylamine. Compounds where $n=2$ or 3, are best prepared by reacting chlorosilanes of the formula $$X\underset{}{Si}Cl$$
$$R'_2$$

with diols of the formula $$HO(\underset{R'_2}{Si}O)_n\underset{R_2}{Si}-\bigcirc-\underset{R_2}{Si}(O\underset{R'_2}{Si})_nOH$$

where $n=1$ or 2 by the same method as defined above. The chlorosilanes are present in a molar ratio of at least two moles of chlorosilane to one mole of diol and preferably the chlorosilane is present in excess. An excess of up to 50 mol percent is convenient. The chlorosilane condenses with the silphenylene diol wherein the silicon-bonded chlorine atom and hydroxyl radical by-produce HCl which is taken up by the acid acceptor. The reaction is usually carried out in an organic solvent such as diethylether, tetrahydrofuran, toluene and/or dioxane.

The diols of the formula

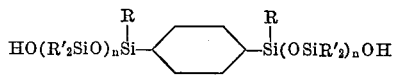

are best prepared by the hydrolysis of the compounds

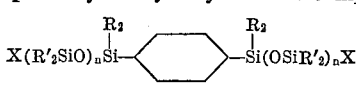

where X is a hydrogen atom by adding the compound dropwise to an aqueous mixture of palladium on carbon and organic solvent heated slightly above room temperature, such as 30° to 50° C. When X is halogen or alkoxy the diols are best prepared by hydrolysis of the compounds by mixing them with a cold aqueous solution of sodium carbonate.

The compounds of the formula

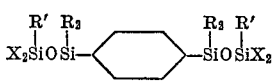

are best prepared by reacting chlorosilanes of the formula $R'SiX_2Cl$ with the diols of the formula

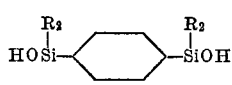

The corresponding hydroxyl compounds are also prepared by the noted hydrolysis methods.

The compounds of the formula

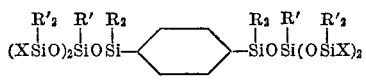

are best prepared by reacting R′₂SiX(OH) with

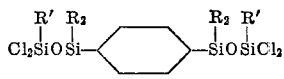

as described above.

The compounds of the formula

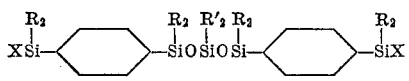

are best prepared by reacting R′₂SiXCl and

but where the molar ratio of the chlorosilane and the diol is 1 to 2.

The alkoxy radicals can have from 1 to 4 carbon atoms such as methoxy, ethoxy, propoxy, butoxy, isopropoxy, isobutoxy and tertiary butoxy.

The preferred compounds are those in which R is a methyl radical and R′ is a phenyl radical. These compounds are more readily prepared and produce polymers which have excellent heat stability.

The compounds of the present invention are particularly useful for producing polymers which have regular ordered structures. Resins can be prepared from hydrolyzing and condensing compounds of the formula

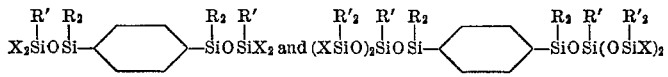

Elastomers can be prepared from

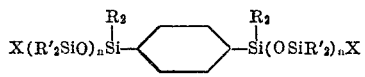

by hydrolyzing and condensing. The polymers can be condensed employing conventional catalysts for silanol condensation.

The following examples are illustrative only and should not be construed as limiting the invention which is properly delineated in the appended claims.

Example 1

A solution of 31.7 g. of p-bis(dimethylhydroxysilyl) benzene in 128 ml. of tetrahydrofuran was added dropwise over a period of one hour to a mixture of 61.3 g. of diphenylchlorosilane and 28.9 g. of triethylamine dissolved in 64 ml. of tetrahydrofuran. The reaction mixture was stirred during the addition and was maintained at a temperature of from 15 to 20° C. After addition was complete, the mixture was stirred for 30 minutes and then allowed to stand for one hour at 25° C. 320 ml. of diethylether was then added and the mixture was filtered to remove the triethylamine hydrochloride.

The filtrate was stored at −6° C. overnight and again filtered. The filtrate was washed with two 300 ml. portions of .5 N ammonium chloride followed by four 300 ml. washings with water. The solvent was removed under reduced pressure at 25° C. The residue was then dissolved in petroleum ether and the product filtered to remove unreacted silphenylene diol. The solvent was then removed and after cooling to −6° C., 80 ml. of methanol were added and fine white crystals were filtered. The product was recrystallized from a mixture of 203 ml. of acetonitrile and 446 ml. of methanol to give fine white needles, melting point from 45 to 46° C. Elemental analysis and NMR spectra showed the material to be

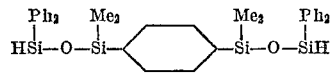

Example 2

63.4 g. of p-bis(dimethylhydroxysilyl)benzene was reacted with 57.8 g. of dimethylchlorosilane in tetrahydrofuran in the presence of trimethylamine and as shown in Example 1. After removal of the diethylether, the product was distilled and there was obtained the compound

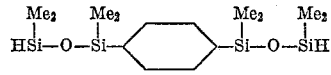

having the following properties. Boiling point 126.5° to 126.8° C. at 5 mm., $n_D^{25}$ 1.4590, $d_4^{25}$ 0.9104 and $R_D$ 0.3003.

Example 3

A mixture of 20.2 g. of triethylamine and 24.9 g. of dimethylmethoxychlorosilane were dissolved in 50 ml. of anhydrous diethylether and the solution was added to a solution of 22.6 g. of p-bis(dimethylhydroxysilyl)benzene dissolved in 350 ml. of anhydrous ether. The reaction mixture was stirred and cooled to 20° to 25° C. during the reaction and for an additional period of 25 minutes thereafter. The reaction mixture was allowed to stand at 25° C. for 69 hours, and the amine hydrochloride was then filtered. The ether solution was washed with .1 N hydrochloric acid until it was about neutral. Fractional distillation of the residue gave the compound

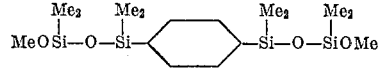

having the following properties. Boiling point 152.6° to 153.6° C. at 5 mm., $n_D^{25}$ 1.4537, $d_4^{25}$ 0.9633 and $R_D$ 0.2809.

Example 4

To a system flushed with dry nitrogen 54.9 g. of p-bis-(1,1,3,3-tetramethyldisiloxanyl)benzene was added dropwise over a period of 2.3 hours to a stirred mixture of 29 ml. of buffer solution, 300 ml. of dioxane and 1.91 g. of 5% palladium dispersed on carbon at 27 to 32° C. Hydrogen was evolved for a total of 2.75 hours. The system was flushed with dry nitrogen, filtered and rinsed with 25 ml. of dioxane and the solution was poured with vigorous stirring into 600 ml. of ice water. A solid precipitate was obtained which was washed several times with water and purified by dissolving in 150 ml. of warm toluene and reprecipitated by the addition of 500 ml. of hexane. The product, thus obtained was recrystallized by dissolving in a mixture of 140 ml. of toluene and 463 ml. hexane warmed to just below its boiling point and then allowing the solution to cool. The crystalline product had a melting point of 93° to 93.5° C. and was shown by elemental analysis and NMR to be the compound

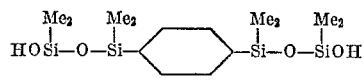

Example 5

Using the procedure of Example 4, 11.8 g. of p-bis(1,1-dimethyl-3,3-diphenyldisiloxanyl)benzene was reacted with 6 ml. of water in the presence of 0.24 g. of 5% palladium on carbon. The crystalline product obtained has a melting point from 68° to 69° C. and was shown by elemental analysis and NMR to be the compound

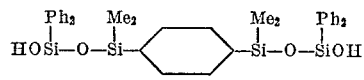

Example 6

To a 500 ml. 3-necked flask equipped with a dropping funnel, stirrer and condenser containing 35.12 g. (0.16 mol) of diphenylchlorosilane was added 17.09 g. (0.168 mol) of triethylamine and 100 ml. of tetrahydrofuran, both being chilled with an ice-water cooling bath. The entire mixture was allowed to cool for 15 minutes. A solution of 50 g. (0.08 mol) of p-bis(3-hydroxy-1,1-dimethyl-3,3-diphenyldisiloxanyl)benzene in 100 ml. of tetrahydrofuran was then added dropwise over a period of 1.25 hours to the stirred cold mixture. After the addition, the cooling bath was removed and the reaction mixture was stirred for an additional hour. The triethylamine-hydrochloride which formed was filtered off and the residue was washed with 100 ml. of diethylether. The combined filtrate, including the ether wash, was washed with 0.5 weight percent ammonium chloride-water solution to a pH of 7 and with three 100 ml. portions of water. The solution was then devolatilized at reduced pressure to a maximum temperature of 50° C. at 1 mm. Hg. The non-volatile fraction was chilled in an ice bath and treated with 100 ml. of methanol to effect crystallization of the solid. The solid was recrystallized twice from 210 ml. of hexane. The product was an SiH-containing compound which was determined to be

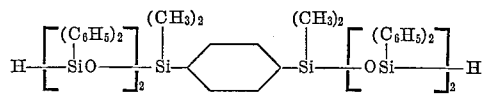

by NMR spectrum, infrared spectrum and elemental analysis. The melting point was 56° to 57.5° C.

Example 7

In the order given, the following ingredients were charged into a 500 ml. 3-neck flask under a dry nitrogen blanket: 0.65 g. of palladium on carbon (5 weight percent palladium), 78 ml. of tetrahydrofuran and 8.9 ml. of water. The flask was attached to a gasometer and heated to 35° C. To the magnetically stirred mixture was added dropwise a solution of 29.0 g. (0.029 mol) of p-bis(1,1-dimethyl-3,3,5,5-tetraphenyltrisiloxyanyl)benzene in 29 ml. of tetrahydrofuran over a two hour period. Following the cessation of evolution of hydrogen, the solution was filtered through a diatomaceous earth filtering bed to remove the catalyst. The solution was devolatilized to 50° C. at 1 mm. Hg to remove the tetrahydrofuran and excess water. The product was grey and was dissolved in 100 ml. of diethylether and washed with water. The ether was stripped at reduced pressure to a maximum of 50° C. The product recrystallized from a toluene-hexane (1 to 7 volume ratio) mixture had a melting point of 77° C. The yield was 93%. The product obtained was

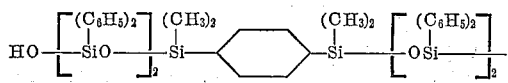

as determined by elemental analysis, NMR spectrum and infrared spectrum.

Example 8

To a 5-liter, 3-necked flask equipped with a stirrer, a dropping funnel, and a reflux condenser containing 478 g. (2.5 mol) of phenylmethyldichlorosilane and 500 ml. of diethylether, the flask being chilled by an ice bath, was added 226 g. (1.0 mol) of

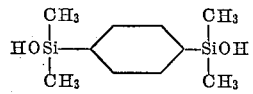

(2.0 mol) of alpha-picoline and 500 ml. of diethylether. After the addition of the above ingredients, the ice bath was removed and the mixture was stirred for an additional 30 minutes. The alpha-piccoline hydrochloride formed during the reaction was filtered off and the filtrate was devolatilized by heating up to 150° C. at 40 mm. Hg and then up to 210° C. at less than 1 mm. Hg. The product characterized by infrared spectrum and elemental analysis was

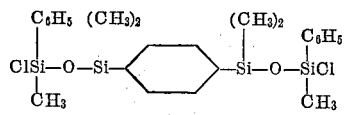

A diethylether solution of the above compound was hydrolyzed with an aqueous sodium carbonate solution and ice until the hydrochloric acid had been removed. The product was

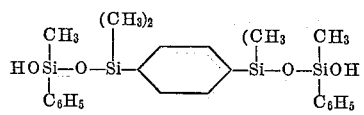

Example 9

Following the procedure of Example 8 and reacting 1 mol of

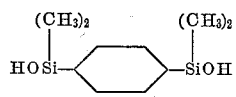

with 2 moles of $(C_6H_5)_2SiCl_2$,

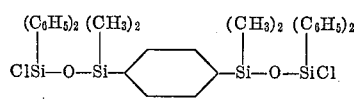

was formed. One mole of this product was reacted with 2 moles of $(C_6H_5)_2Si(OH)_2$ by the same procedure and

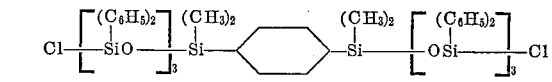

was produced. One mole of this product was reacted with 2 moles of $(C_6H_5)_2SiCl_2$ by the procedure of Example 8 which formed

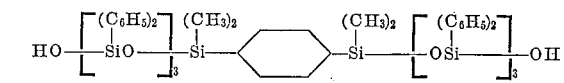

This product was then hydrolyzed by the hydrolysis procedure of Example 8 and

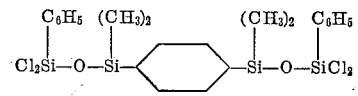

was obtained.

Example 10

The preparation of

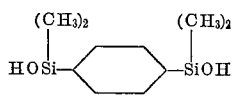

according to the procedure of Example 8 was carried out with 1.0 mole of

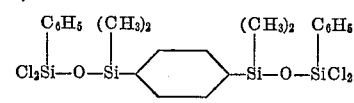

2.4 moles of $C_6H_5SiCl_3$ and 2.0 moles of alpha-picoline. The product,

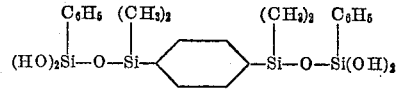

was hydrolyzed according to the procedure of Example 8 and gave $(HO)_2Si$—O—Si—⟨⟩—Si—O—Si$(OH)_2$  (with $C_6H_5$, $(CH_3)_2$, $(CH_3)_2$, $C_6H_5$ groups)

Example 11

A mixture of 0.4 mole of

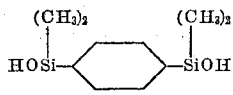

1.0 mole of C$_6$H$_5$Si(OCH$_3$)$_3$ and 0.1 weight percent potassium acetate was refluxed until no methanol was being collected. At this point (CH$_3$)$_3$SiCl was added to kill the catalyst. The product was

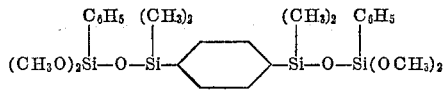

Example 12

The procedure of Example 11 was used to prepare

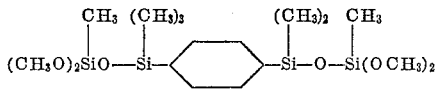

The reactants were 0.25 mole of

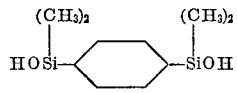

0.55 mole of CH$_3$Si(OCH$_3$)$_3$ and 0.1 weight percent potassium acetate.

Example 13

Following the procedure of Example 8, 0.1 mole of

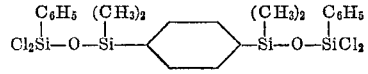

0.4 mole of (C$_6$H$_5$)$_2$Si(OH)$_2$ and 0.4 mole of aniline was used. The product obtained was

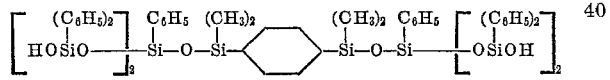

Example 14

Following the procedure of Example 8, 0.5 mole of (C$_6$H$_5$)$_2$SiCl$_2$, 1.1 moles of

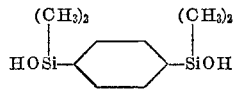

and 1.0 mole of alpha-picoline was reacted and the product obtained was

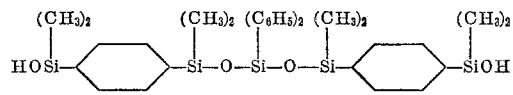

Example 15

When two moles of

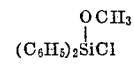

is reacted with one mole of

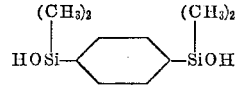

according to the procedure of Example 1,

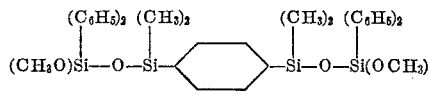

is obtained.

Example 16

When two moles of

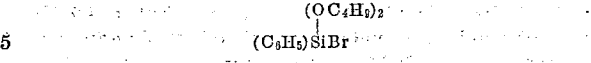

is reacted with one mole of

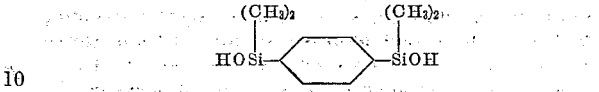

according to the procedure of Example 1,

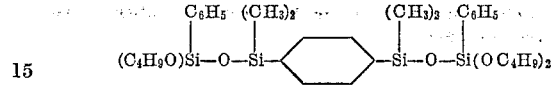

is obtained.

Example 17

When two moles of

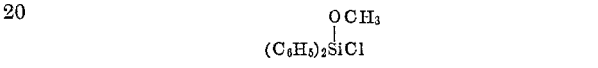

is reacted with one mole of

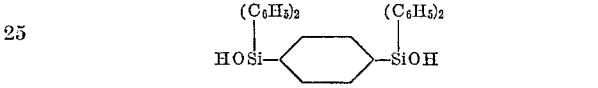

according to the procedure of Example 1,

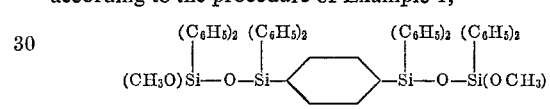

is obtained.

That which is claimed is:

1. A composition of matter of a formula selected from the group consisting of

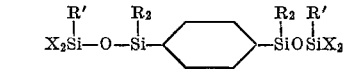

and

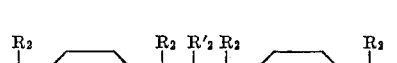

where each R and R' is a monovalent hydrocarbon radical selected from the group consisting of methyl radicals and phenyl radicals, X is a monovalent radical selected from the group consisting of halogen atoms, hydrogen atoms, hydroxy radicals, and alkoxy radicals having from 1 to 4 inclusive carbon atoms, and $n$ is an integer from 1 to 3 inclusive.

2. A composition of matter of the formula

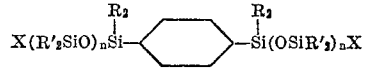

where each R and R' is a monovalent hydrocarbon radical selected from the group consisting of methyl radicals and phenyl radicals, X is a monovalent radical selected from the group consisting of halogen atoms, hydrogen atoms, hydroxyl radicals and alkoxy radicals having from 1 to 4 inclusive carbon atoms, and $n$ is an integer from 1 to 3 inclusive.

3. A composition of matter in accordance with claim 2 wherein $n$ is 1.

4. A compound of the formula

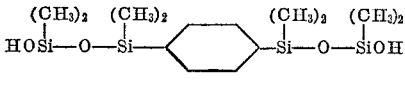

5. A compound of the formula

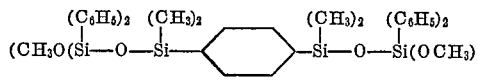

6. A compound of the formula

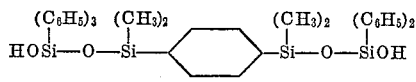

7. A compound of the formula

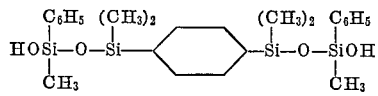

8. A compound of the formula

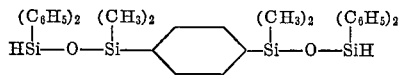

9. A composition of matter in accordance with claim 2 wherein $n$ is 2.

10. A compound of the formula

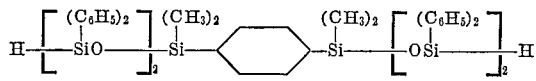

11. A compound of the formula

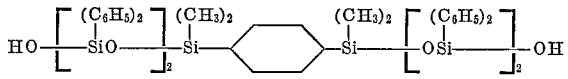

12. A composition of matter in accordance with claim 2 wherein $n$ is 3.

13. A compound of the formula

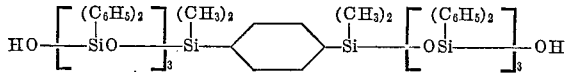

14. A composition of matter of the formula

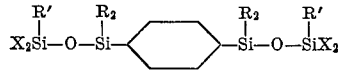

where each R and R' is a monovalent hydrocarbon radical selected from the group consisting of methyl radicals and phenyl radicals, X is a monovalent radical selected from the group consisting of hydrogen atoms, halogen atoms, hydroxyl radicals and alkoxy radicals having from 1 to 4 inclusive carbon atoms.

15. A compound of the formula

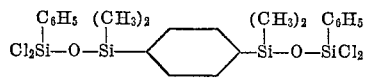

16. A compound of the formula

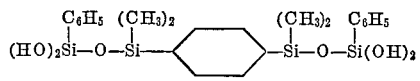

17. A compound of the formula

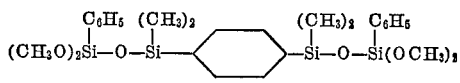

18. A compound of the formula

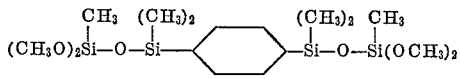

19. A composition of matter of the formula

where each R and R' is a monovalent hydrocarbon radical selected from the group consisting of methyl radicals and phenyl radicals and X is a monovalent radical selected from the group consisting of halogen atoms, hydrogen atoms, hydroxyl radicals and alkoxy radicals having from 1 to 4 inclusive carbon atoms.

20. A compound of the formula

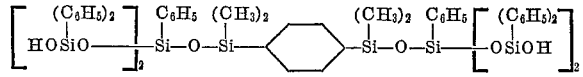

21. A composition of matter of the formula

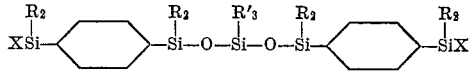

where each R and R' is a monovalent hydrocarbon radical selected from the group consisting of methyl radicals and phenyl radicals and X is a monovalent radical selected from the group consisting of halogen atoms, hydrogen atoms, hydroxyl radicals and alkoxy radicals having from 1 to 4 inclusive carbon atoms.

22. A compound of the formula

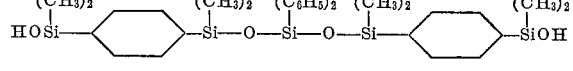

References Cited
UNITED STATES PATENTS

| | | | |
|---|---|---|---|
| 2,819,282 | 1/1958 | Clark | 260—448.2 |
| 3,117,149 | 1/1964 | Holdstock | 260—448.2 |
| 3,135,777 | 6/1964 | Nielsen | 260—448.2 |
| 3,150,115 | 9/1964 | Clark et al. | 260—448.2 XR |
| 3,175,993 | 3/1965 | Weyenberg | 260—448.2 XR |
| 3,287,310 | 11/1966 | Omietanski | 260—448.2 XR |
| 3,332,973 | 7/1967 | Merker | 260—448.2 |
| 3,336,352 | 8/1967 | Omietanski | 260—448.2 |

TOBIAS E. LEVOW, *Primary Examiner.*

P. F. SHAVER, *Assistant Examiner.*